US 8,089,725 B2

(12) United States Patent  
Hsiao et al.

(10) Patent No.: US 8,089,725 B2  
(45) Date of Patent: Jan. 3, 2012

(54) MAGNETIC HEAD HAVING A STEPPED OR SEGMENTED WRAP AROUND SHIELD AND METHODS OF FORMATION THEREOF

(75) Inventors: Wen-Chien David Hsiao, San Jose, CA (US); Yansheng Luo, Fremont, CA (US)

(73) Assignee: Hitachi Global Storage Technology Netherlands B.V., Amsterdam (NL)

( * ) Notice: Subject to any disclaimer, the term of this patent is extended or adjusted under 35 U.S.C. 154(b) by 336 days.

(21) Appl. No.: 12/508,860

(22) Filed: Jul. 24, 2009

(65) Prior Publication Data

US 2011/0019309 A1    Jan. 27, 2011

(51) Int. Cl.  
*G11B 5/127*    (2006.01)
(52) U.S. Cl. .................................... 360/125.3
(58) Field of Classification Search .............. 360/125.3, 360/125.03, 125.09, 125.04, 125.17, 123.1, 360/125.12, 125.16, 125.15, 125.06, 125.26, 360/125.13, 122, 317  
See application file for complete search history.

(56) References Cited

U.S. PATENT DOCUMENTS

2010/0062177 A1*    3/2010    Jiang et al. .................... 427/551

* cited by examiner

*Primary Examiner* — Allen Cao  
(74) *Attorney, Agent, or Firm* — Zilka-Kotab, PC

(57) ABSTRACT

According to one embodiment, a system comprises a magnetic pole having a media-facing end and a wrap around shield spaced from the magnetic pole, wherein the wrap around shield has a media-facing end positioned along three sides of the media-facing end of the magnetic pole and has inner, second, and middle regions separated by transitional regions. The inner region is closest to the media facing end of the magnetic pole, the second region is farthest from the media facing end of the magnetic pole, and the middle region is between the inner and second regions. A cross-sectional height of the inner region measured perpendicularly to the wrap around shield's media-facing end is less than a cross-sectional height of the second region, and a cross-sectional height of the middle region is greater than the cross-sectional height of the inner region and less than the cross-sectional height of the second region.

24 Claims, 6 Drawing Sheets

MAGNETIC HEAD HAVING A STEPPED OR SEGMENTED WRAP AROUND SHIELD AND METHODS OF FORMATION THEREOF

FIELD OF THE INVENTION

The present invention relates to data storage systems, and more particularly, this invention relates to a magnetic head having a stepped and/or segmented wrap around shield.

BACKGROUND OF THE INVENTION

In typical magnetic heads which include wrap around shields, the wrap around shield is formed via full film plating of the material (such as NiFe, CoNiFe, CoFe, etc.) which forms the wrap around shield. However, the wrap around shield develops undesirable stress after lapping, a finishing procedure commonly performed on magnetic head components prior to use. The lapping induces an undesired stress in the plated structure, which can degrade the magnetic material property of the wrap around shield. The degradation includes the loss of the ability to conduct the magnetic flux flow and creates an undesired local magnetic micro region which can cause data erasure.

Therefore, it would be beneficial to create and/or use magnetic heads which use a wrap around shield without the stresses inherent in existing heads.

SUMMARY OF THE INVENTION

According to one embodiment, a system comprises a magnetic pole having a media-facing end and a wrap around shield spaced from the magnetic pole, wherein the wrap around shield has a media-facing end positioned along three sides of the media-facing end of the magnetic pole and has inner, second, and middle regions separated by transitional regions. The inner region is closest to the media facing end of the magnetic pole, the second region is farthest from the media facing end of the magnetic pole, and the middle region is between the inner and second regions. A cross-sectional height of the inner region measured perpendicularly to the wrap around shield's media-facing end is less than a cross-sectional height of the second region, and a cross-sectional height of the middle region is greater than the cross-sectional height of the inner region and less than the cross-sectional height of the second region.

A system, according to another embodiment, comprises a magnetic pole having a media-facing end, and a wrap around shield spaced from the magnetic pole, wherein the wrap around shield has a media-facing end positioned along three sides of the media-facing end of the magnetic pole, wherein the wrap around shield has inner and second regions separated from each other by a transitional region. The inner region is closest to the media facing end of the magnetic pole, and the second region is farther from the media facing end of the magnetic pole than the inner region. Also, cross-sectional heights of the regions of the wrap around shield are measured in a direction perpendicular to the media-facing end of the wrap around shield. A cross-sectional height of the inner region is less than a cross-sectional height of the second region, and the second region is divided into two sections by a nonmagnetic gap.

In another embodiment, a method comprises forming a magnetic pole having a media-facing end and forming a wrap around shield spaced from the magnetic pole. The wrap around shield has a media-facing end positioned along three sides of the media-facing end of the magnetic pole, and has inner, second, and middle regions separated by transitional regions. The inner region is closest to the media facing end of the magnetic pole, the second region is farthest from the media facing end of the magnetic pole, and the middle region is between the inner and second regions. Also, cross-sectional heights of the regions of the wrap around shield are measured in a direction perpendicular to the media-facing end of the wrap around shield. In addition, a cross-sectional height of the inner region is less than a cross-sectional height of a second region, and a cross-sectional height of the middle region is greater than the cross-sectional height of the inner region and less than the cross-sectional height of the second region.

According to another embodiment, a method comprises forming a magnetic pole having a media-facing end, and forming a wrap around shield spaced from the magnetic pole. The wrap around shield has a media-facing end positioned along three sides of the media-facing end of the magnetic pole, and the wrap around shield has inner and second regions separated from each other by a transitional region. The inner region is closest to the media facing end of the magnetic pole and the second region is farther from the media facing end of the magnetic pole than the inner region. Also, cross-sectional heights of the regions of the wrap around shield are measured in a direction perpendicular to the media-facing end of the wrap around shield. In addition, a cross-sectional height of the inner region is less than a cross-sectional height of the second region, and the second region is divided into two sections by a nonmagnetic gap.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
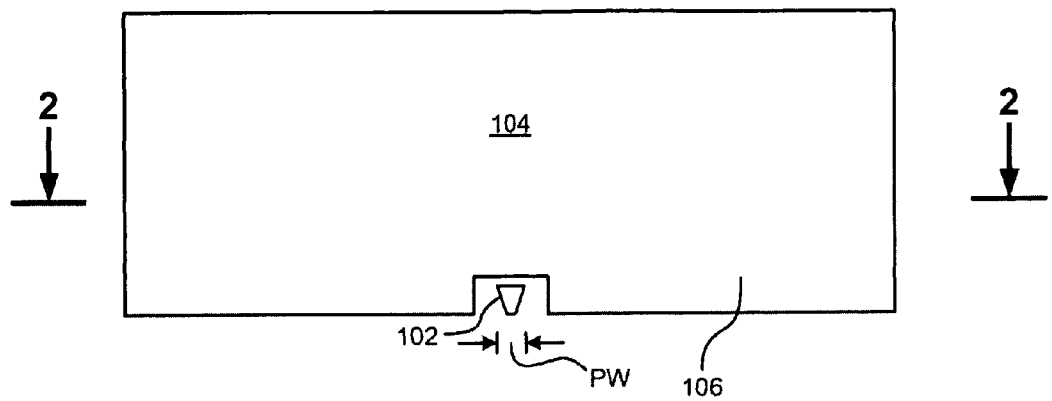
FIG. 1 is an ABS view of a portion of a magnetic head according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a system comprises a magnetic pole having a media-facing end and a wrap around shield spaced from the magnetic pole, wherein the wrap around shield has a media-facing end positioned along three sides of the media-facing end of the magnetic pole. The wrap around shield has inner, second, and middle regions separated by transitional regions, the inner region being closest to the media facing end of the magnetic pole, the second region being farthest from the media facing end of the magnetic pole, and the middle region being between the inner and second regions. Also, cross-sectional heights of the regions of the wrap around shield are measured in a direction perpendicular to the media-facing end of the wrap around shield, a cross-sectional height of the inner region is less than a cross-sectional height of the second region, and a cross-sectional height of the middle region is greater than the cross-sectional height of the inner region and less than the cross-sectional height of the second region.

In another general embodiment, a system comprises a magnetic pole having a media-facing end and a wrap around shield spaced from the magnetic pole, wherein the wrap around shield has a media-facing end positioned along three sides of the media-facing end of the magnetic pole. Also, the wrap around shield has inner and second regions separated from each other by a transitional region, the inner region being closest to the media facing end of the magnetic pole, the second region being farther from the media facing end of the magnetic pole than the inner region, and cross-sectional heights of the regions of the wrap around shield are measured in a direction perpendicular to the media-facing end of the wrap around shield. Furthermore, a cross-sectional height of the inner region is less than a cross-sectional height of the second region, and the second region is divided into two sections by a nonmagnetic gap.

In yet another general embodiment, a method comprises forming a magnetic pole having a media-facing end and forming a wrap around shield spaced from the magnetic pole, wherein the wrap around shield has a media-facing end positioned along three sides of the media-facing end of the magnetic pole. Also, the wrap around shield has inner, second, and middle regions separated by transitional regions, the inner region being closest to the media facing end of the magnetic pole, the second region being farthest from the media facing end of the magnetic pole, and the middle region being between the inner and second regions, and cross-sectional heights of the regions of the wrap around shield are measured in a direction perpendicular to the media-facing end of the wrap around shield. Furthermore, a cross-sectional height of the inner region is less than a cross-sectional height of the second region, and a cross-sectional height of the middle region is greater than the cross-sectional height of the inner region and less than the cross-sectional height of the second region.

In another general embodiment, a method comprises forming a magnetic pole having a media-facing end and forming a wrap around shield spaced from the magnetic pole, wherein the wrap around shield has a media-facing end positioned along three sides of the media-facing end of the magnetic pole. The wrap around shield has inner and second regions separated from each other by a transitional region, the inner region being closest to the media facing end of the magnetic pole, the second region being farther from the media facing end of the magnetic pole than the inner region, and cross-sectional heights of the regions of the wrap around shield are measured in a direction perpendicular to the media-facing end of the wrap around shield. Also, a cross-sectional height of the inner region is less than a cross-sectional height of the second region, and the second region is divided into two sections by a nonmagnetic gap.

For the sake of clarity, all edges are shown with sharp delineations between lines, whereas in practice, due to the minute sizes of the components in a magnetic head the methods of production thereof, many edges may be more gradually delineated. However, in some embodiments, the shapes as shown may be representative of the magnetic head as produced, although not to scale.

Figure 2:
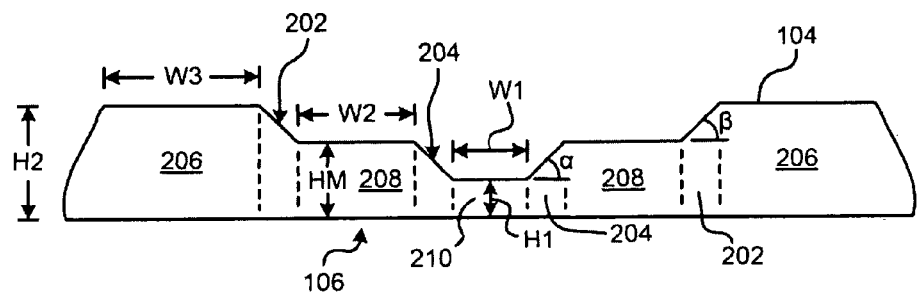
FIG. 2 is a cross sectional view of a portion of a magnetic head taken from line 2 in FIG. 1, according to one embodiment.

Referring to FIG. 1, a wrap around shield (WAS) 104 and main pole tip 102 are shown from an air bearing surface (ABS) view, according to one embodiment. The width of the magnetic pole tip 102 at the ABS is identified as PW. FIG. 2 is a cross sectional view of the WAS 104 taken from line 2 in FIG. 1.

FIG. 2 shows an embodiment where there are two "steps" in the WAS 104, thereby resulting in better permeability and less magnetic domain complication. With reference to FIGS. 1-2, a system, in one embodiment, includes a magnetic pole 102 having a media-facing end positioned towards an ABS, i.e., the end of the magnetic pole 102 may form part of the ABS of the magnetic head, may be covered with an overcoat that forms the ABS, etc. The system also includes a WAS 104 spaced from the magnetic pole 102, wherein the WAS 104 has a media-facing end 106 positioned at least partially along three sides of the media-facing end of the magnetic pole 102. Note that the media-facing end 106 of the WAS 104 may lie in the same plane as the media-facing end of the magnetic pole 102, or they may lie in different planes, where the planes may be substantially parallel or non-parallel. Also, the WAS 104 has an inner region 210, a second region 206, and a middle region 208 separated by transitional regions 202, 204, the inner region 210 being closest to the media facing end of the magnetic pole 102, the second region 206 being farthest from the media facing end of the magnetic pole 102 (at least in a vertical direction as viewed in FIG. 1), and the middle region 208 being between the inner region 210 and the second region 206. As can be seen in FIGS. 1-2, the WAS 104 may be fairly symmetrical along a vertical line extending through the middle of the magnetic pole 102. In addition, cross-sectional heights of the regions of the WAS 104 are measured in a direction perpendicular to the media-facing end of the WAS 104, as indicated by heights H1, H2, and HM. Further, a cross-sectional height H1 of the inner region 210 is less than a cross-sectional height H2 of the second region 206, and a cross-sectional height HM of the middle region 208 is greater than the cross-sectional height H1 of the inner region 210 and less than the cross-sectional height H2 of the second region 206.

According to some approaches, the inner region 210, middle region 208, and second region 206 may have faces positioned opposite the media-facing end 106 of the WAS 104, and the faces are preferably substantially parallel to the media-facing end 106 of the WAS 104, though need not be. Also, the heights of the regions (H1, H2, HM) are measured between the media-facing end 106 of the WAS 104 and the respective face.

In some embodiments, the transition regions 202, 204 may be angled relative to a plane of the media-facing end 106 of the WAS 104. The transition regions 202, 204 may be angled at an angle (α, β) of between about 8° and about 25°, preferably at an angle (α, β) of between about 10° and about 15°, from the plane of the media-facing end 106 of the WAS 104. In more embodiments, angle α is about the same as angle β. In some alternative approaches, angle α is different from angle β.

A width W1 of the inner region 210 measured in a direction parallel to a plane of deposition of the WAS 104 and the media-facing end 106 thereof may be between about a width PW of the media-facing end of the magnetic pole 102 and about 2 times width PW. In some preferred approaches, the width W1 may be between about a width PW and about 1.5 times width PW. In some more approaches, a width W2 of the middle region 208 on one side of the magnetic pole 102 may be between about 2.5 times width W1 and about 10 times width W1.

In some approaches, the height H1 of the inner region 210 may be between about 75 nm and about 250 nm. In some further approaches, the height H1 may be between about 100 nm and about 150 nm. In a further embodiment, the height HM of the middle region 208 may be between about 1.5 times height H1 and about 3 times height H1. Also, in another embodiment, the height H2 of the second region 206 may be between about 1.5 times height HM and about 5 times height HM.

Figure 3:
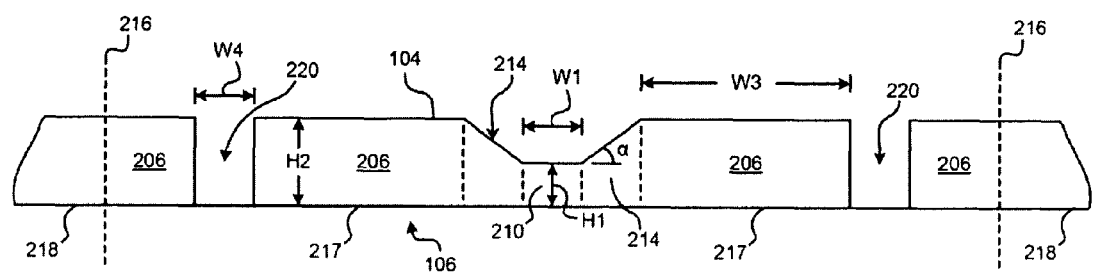
FIG. 3 is a cross sectional view of a portion of a magnetic head, according to one embodiment.
Figure 4:
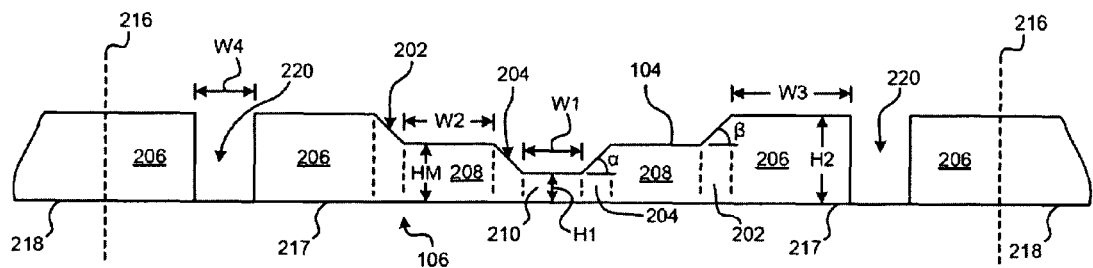
FIG. 4 is a cross sectional view of a portion of a magnetic head, according to one embodiment.

Now referring to FIGS. 1, 3-4, according to more approaches, the system may further comprise a gap 220 in the second region 206 that separates the second region into multiple pieces 217, 218.

Figure 5:
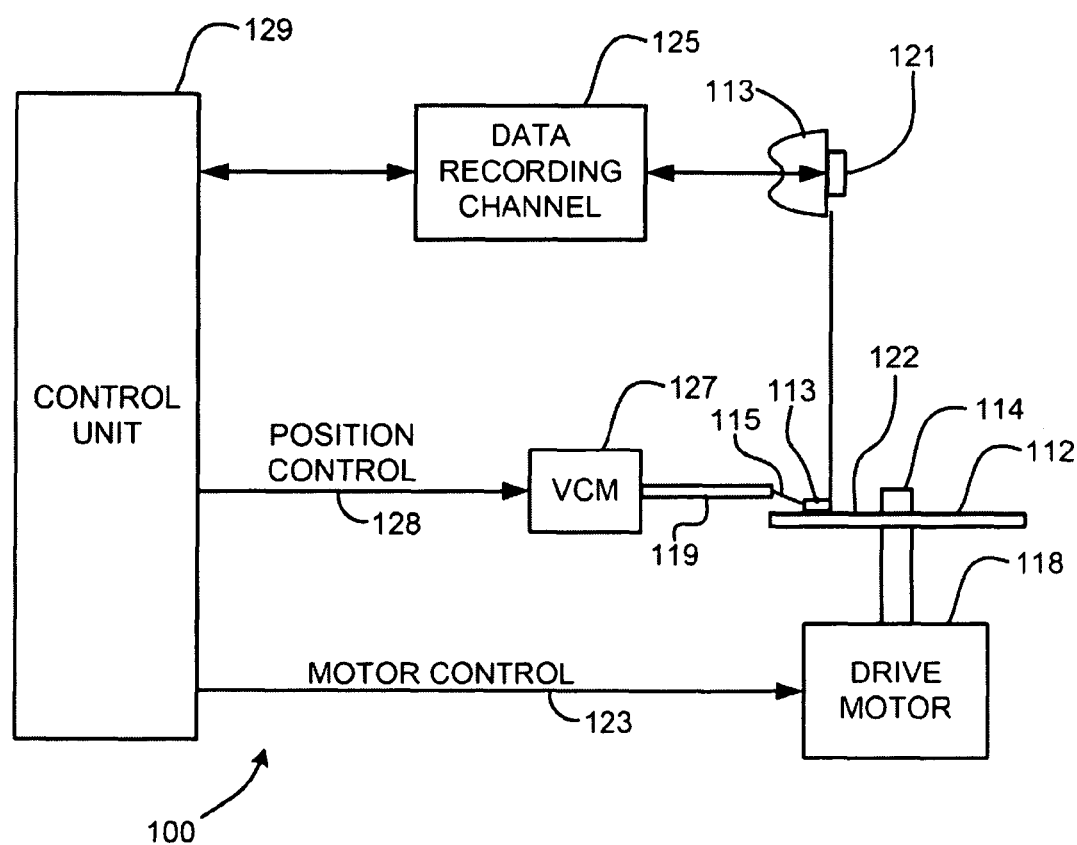
FIG. 5 is a simplified drawing of a magnetic recording disk drive system.

In some additional approaches, any of the embodiments described above may be included in a system which further includes at least one head for reading from and writing to a magnetic medium, each head having a sensor for reading data written by the magnetic pole, a slider for supporting the head, and a control unit coupled to the head for controlling operation of the head. A typical magnetic disk storage system 100 is shown in FIG. 5, and is explained in more detail with reference to FIG. 5 below. However, the components of a system described directly above may be similar to those represented in FIG. 5, an exemplary embodiment of a magnetic disk storage system.

With reference to FIGS. 1 and 3, in another embodiment, a system includes a magnetic pole 102 having a media-facing end and a wrap around shield (WAS) 104 spaced from the magnetic pole 102, wherein the WAS 104 has a media-facing end 106 positioned at least partially along three sides of the media-facing end of the magnetic pole 102. Note that the media-facing end 106 of the WAS 104 may lie in the same plane as the media-facing end of the magnetic pole 102, or they may lie in different planes, where the planes may be substantially parallel or non-parallel. Also, the WAS 104 has an inner region 210 and second regions 206 separated from each other by a transitional region 214, the inner region 210 being closest to the media facing end of the magnetic pole 102, the second region 206 being farther from the media facing end of the magnetic pole 102 than the inner region 210. In addition, cross-sectional heights of the regions of the WAS 104 are measured in a direction perpendicular to the media-facing end 106 of the wrap WAS 104, and a cross-sectional height H1 of the inner region 210 is less than a cross-sectional height H2 of the second region 206. Further, the second region 206 is divided into two sections 217, 218 by a nonmagnetic gap 220.

In some approaches, the nonmagnetic gap 220 may be formed of any nonmagnetic material known in the art, such as air, alumina, tantalum, photoresist, polymer, etc.

According to some embodiments, a distal end of the second region 206 farthest from the media-facing end of the magnetic pole 102 and positioned laterally thereto (e.g., in a plane of deposition of the magnetic pole 102) may be positioned beyond a side edge of an upper return pole, as indicated by dashed line 216. In a further embodiment, the nonmagnetic gap 220 may be positioned below the upper return pole.

In some approaches, a width W1 of the inner region 210 measured in a direction parallel to a plane of deposition of the WAS 104 and the media-facing end thereof may be between about a width PW of the media-facing end of the magnetic pole 102 and about 2 times width PW. In some preferred approaches, the width W1 may be between about a width PW and about 1.5 times width PW. In some more approaches, a width W3 of the second region 206 between the transitional region 214 and the nonmagnetic gap 220 on one side of the magnetic pole 102 may be between about 2 times width W1 and about 6 times width W1.

The height H1 of the inner region 210, according to some embodiments, may be between about 75 nm and about 250 nm. In further embodiments, the height H1 may be between about 100 nm and about 175 nm.

In some additional approaches, any of the embodiments described above may be included in a system which further includes at least one head for reading from and writing to a magnetic medium, each head having a sensor for reading data written by the magnetic pole, a slider for supporting the head, and a control unit coupled to the head for controlling operation of the head. A typical magnetic disk storage system 100 is shown in FIG. 5, and is, explained in more detail with reference to FIG. 5 below. However, the components of a system described directly above may be similar to those represented in FIG. 5, an exemplary embodiment of a magnetic disk storage system.

Now referring to FIGS. 1 and 4, according to more approaches, the system may further comprise a middle region 208 of the WAS 104 between the inner region 210 and the second region 206, the middle region 208 being separated from the inner region 210 and the second region 206 by transitional regions 202, 204, wherein cross-sectional heights of the regions of the WAS 104 are measured in a direction perpendicular to the media-facing end of the WAS 104. Also, the cross-sectional height H1 of the inner region 210 is less than the cross-sectional height HM of the middle region 208, and the cross-sectional height HM of the middle region 208 is less than the cross-sectional height H2 of the second region 206.

Referring now to FIG. 5, there is shown a disk drive 100 in accordance with one embodiment of the present invention. As shown in FIG. 5, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 5 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 6:
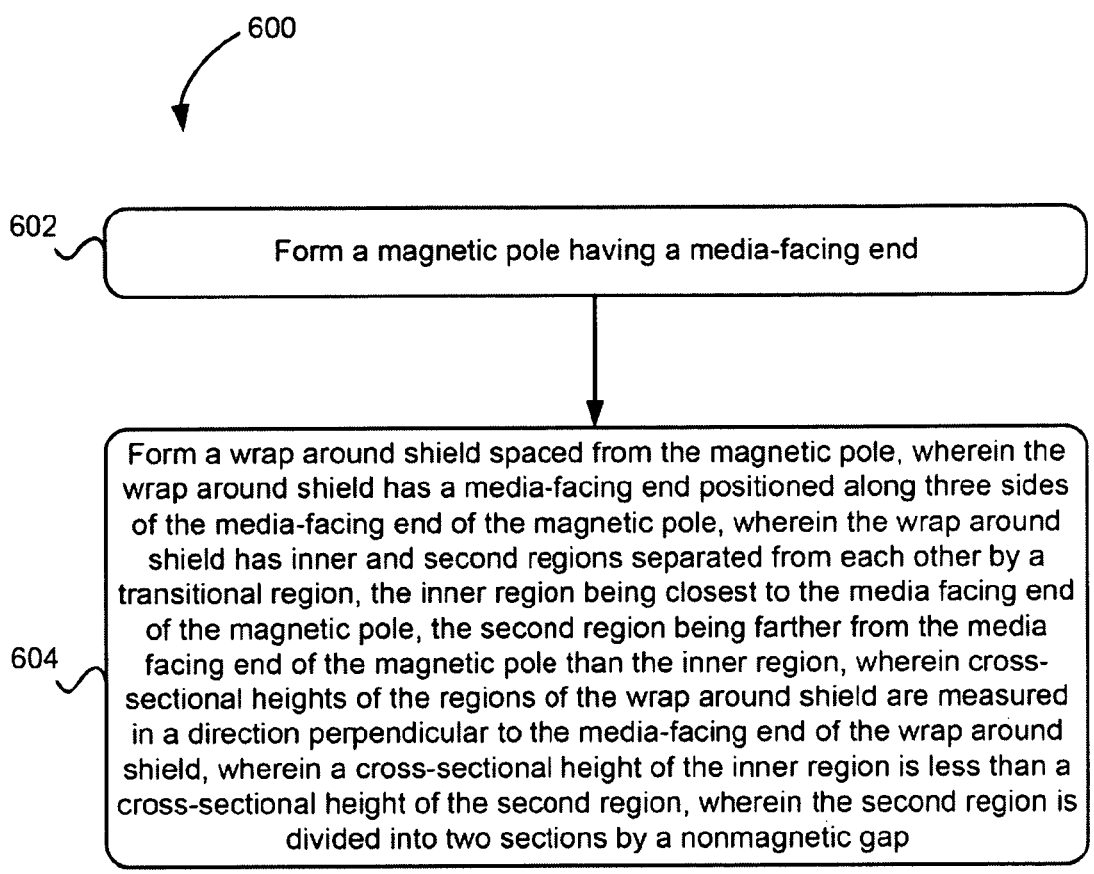
FIG. 6 is a flowchart showing a method according to one embodiment.

With reference to FIG. 6 a method 600 is described according to one embodiment. The method 600 may be executed in any desired environment, and any of the embodiments and/or approaches described above in relation to FIGS. 1-5 may be incorporated into the description of method 600.

In operation 602, a magnetic pole is formed having a media-facing end.

In operation 604, wrap around shield (WAS) is formed spaced from the magnetic pole, wherein the wrap around shield has a media-facing end positioned at least partially along three sides of the media-facing end of the magnetic pole. Note that the media-facing end of the WAS may lie in the same plane as the media-facing end of the magnetic pole, or they may lie in different planes, where the planes may be substantially parallel or non-parallel. Also, the WAS has inner and second regions separated from each other by a transitional region, the inner region being closest to the media facing end of the magnetic pole, the second region being farther from the media facing end of the magnetic pole than the inner region. Also, cross-sectional heights of the regions of the wrap around shield are measured in a direction perpendicular to the media-facing end of the wrap around shield, and a cross-sectional height of the inner region is less than a cross-sectional height of the second region. In addition, the second region is divided into two sections by a nonmagnetic gap. FIG. 3 is one example of a WAS formed through this method 600.

In one approach, a distal end of the second region farthest from the media-facing end of the magnetic pole and positioned laterally thereto (e.g., in a plane of deposition of the magnetic pole) may be positioned beyond a side edge of an upper return pole (such as is indicated by line 306 in FIG. 3).

According to another approach, the nonmagnetic gap (such as is indicated by gap 220 in FIG. 3) may be positioned below the upper return pole (such as is indicated by line 306 in FIG. 3).

Figure 7:
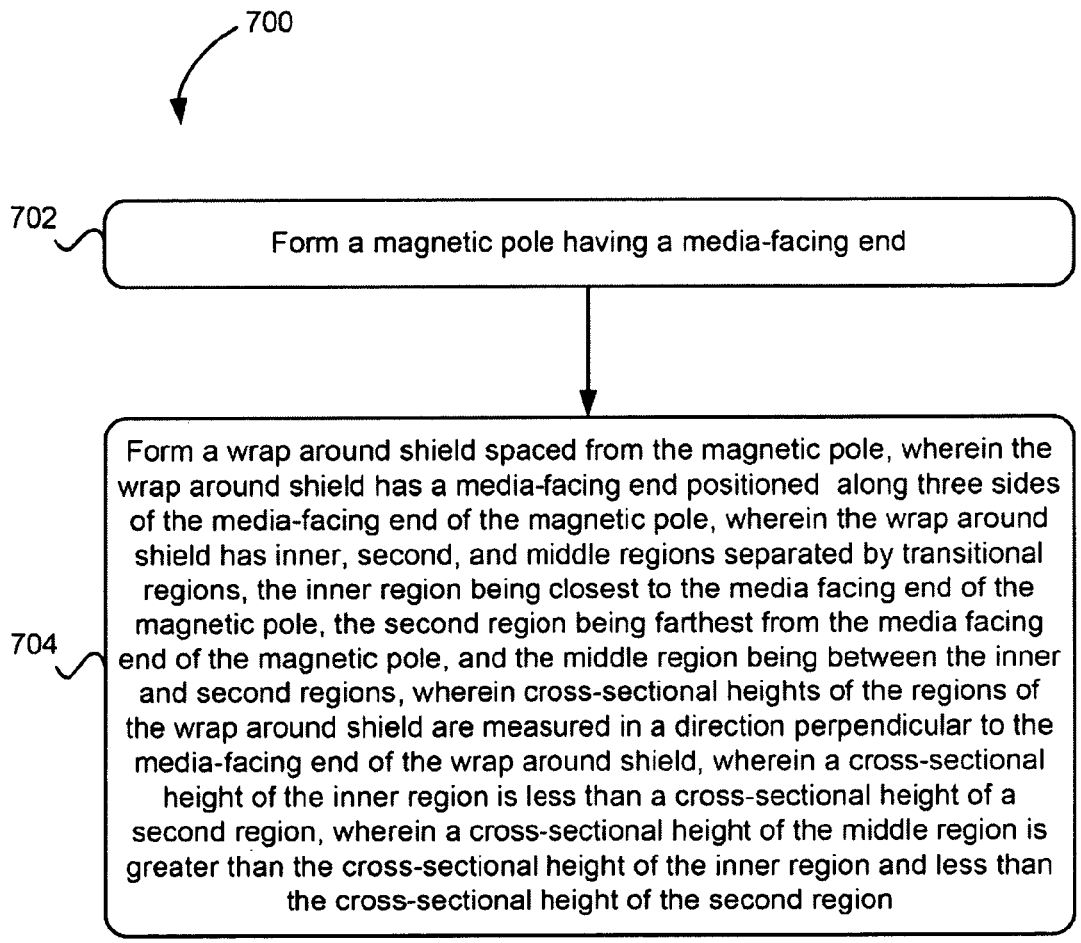
FIG. 7 is a flowchart showing a method according to one embodiment.

With reference to FIG. 7 a method 700 is described according to one embodiment. The method 700 may be executed in any desired environment, and any of the embodiments and/or approaches described above in relation to FIGS. 1-5 may be incorporated into the description of method 700.

In operation 702, a magnetic pole is formed having a media-facing end positioned towards an air bearing surface, i.e., the end of the magnetic pole may form a part of the air bearing surface (ABS) of the magnetic head or may be covered with an overcoat that forms the ABS.

In operation 704, a wrap around shield (WAS) is formed spaced from the magnetic pole, wherein the wrap around shield has a media-facing end positioned at least partially along three sides of the media-facing end of the magnetic pole. Note that the media-facing end of the WAS may lie in the same plane as the media-facing end of the magnetic pole, or they may lie in different planes, where the planes may be substantially parallel or non-parallel. Also, the WAS has inner, second, and middle regions separated by transitional regions, the inner region being closest to the media facing end of the magnetic pole, the second region being farthest from the media facing end of the magnetic pole, and the middle region being between the inner and second regions. In addition, cross-sectional heights of the regions of the WAS are measured in a direction perpendicular to the media-facing end of the WAS, and a cross-sectional height of the inner region is less than a cross-sectional height of a second region. In addition, a cross-sectional height of the middle region is greater than the cross-sectional height of the inner region and less than the cross-sectional height of the second region. FIG. 4 is one example of a WAS formed through this method 600.

According to one embodiment, the method 700 may further comprise forming a gap (such as is indicated by gap 220 in FIG. 4) in the second region (such as is indicated by second region 206 in FIG. 4) that separates the second region into multiple pieces (such as is indicated by regions 217 and 218 in FIG. 4).

Any of the embodiments described above may be employed in a perpendicular magnetic head, such as those shown in FIGS. 8A-9B.

Figure 8A:
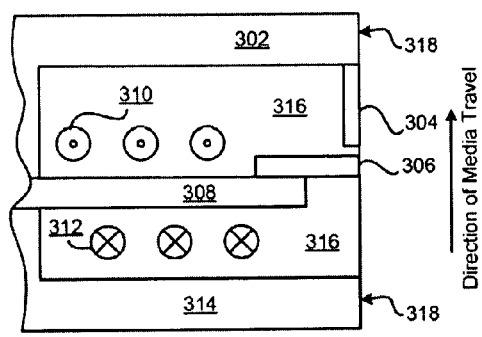
FIG. 8A is a cross-sectional view of one particular embodiment of a perpendicular magnetic head with helical coils.

FIG. 8A is a cross-sectional view of a perpendicular magnetic head. In FIG. 8A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 8B:
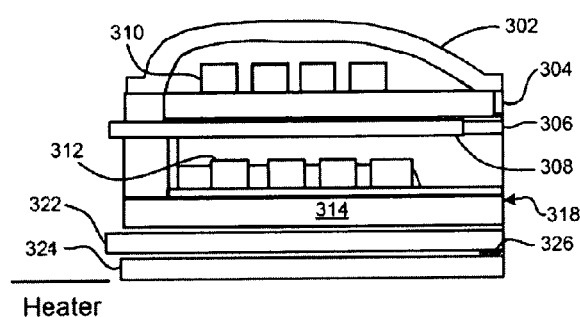
FIG. 8B is a cross-sectional view of one particular embodiment of a piggyback magnetic head with helical coils.

FIG. 8B illustrates a piggyback magnetic head having similar features to the head of FIG. 8A. Two shields 304, 314 flank the stitch pole 308 and main pole 306. Also sensor shields 322, 324 are shown. The sensor 326 is typically positioned between the sensor shields 322, 324.

Figure 9A:
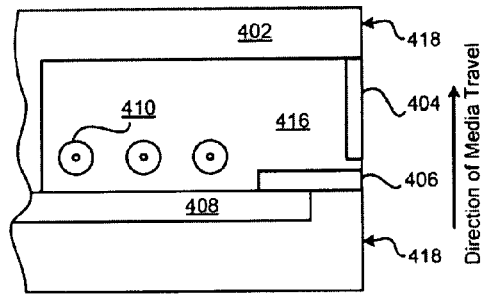
FIG. 9A is a cross-sectional view of one particular embodiment of a perpendicular magnetic head with looped coils.

FIG. 9A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 9B:
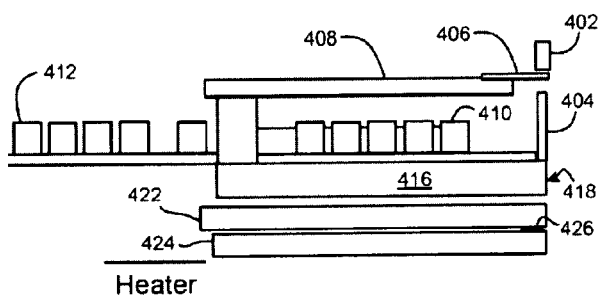
FIG. 9B is a cross-sectional view of one particular embodiment of a piggyback magnetic head with looped coils.

FIG. 9B illustrates another type of piggyback magnetic head having similar features to the head of FIG. 9A including a helical coil 410, which wraps around to form helical coil 412. Also, sensor shields 422, 424 are shown. The sensor 426 is typically positioned between the sensor shields 422, 424.

In FIGS. 8B and 9B, an optional heater is shown near the non-ABS side of the magnetic head. A heater (Heater) may also be included in the magnetic heads shown in FIGS. 8A and 9A. The position of this heater may vary based on design parameters such as where the protrusion is desired, coefficients of thermal expansion of the surrounding layers, etc.

It should be noted that methodology presented herein for at least some of the various embodiments may be implemented, in whole or in part, in computer hardware, software, by hand, using specialty equipment, etc., and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A magnetic head system, comprising:
a magnetic pole having a media-facing end; and
a wrap around shield spaced from the magnetic pole, wherein the wrap around shield has a media-facing end positioned along three sides of the media-facing end of the magnetic pole,
wherein the wrap around shield has inner, second, and middle regions separated by transitional regions, the inner region being closest to the media facing end of the magnetic pole, the second region being farthest from the media facing end of the magnetic pole, and the middle region being between the inner and second regions,
wherein cross-sectional heights of the regions of the wrap around shield are measured in a direction perpendicular to the media-facing end of the wrap around shield,
wherein a cross-sectional height of the inner region is less than a cross-sectional height of the second region,
wherein a cross-sectional height of the middle region is greater than the cross-sectional height of the inner region and less than the cross-sectional height of the second region.

2. The system as recited in claim 1, wherein the inner, middle, and second regions have faces positioned opposite the media-facing end of the wrap around shield, wherein the faces are substantially parallel to the media-facing end of the wrap around shield, wherein the heights of the regions are measured between the media-facing end of the wrap around shield and the respective face.

3. The system as recited in claim 1, wherein the transition regions are angled relative to a plane of the media-facing end of the wrap around shield.

4. The system as recited in claim 3, wherein the transition regions are angled at an angle of between about 8° and about 25°, from the plane of the media-facing end of the wrap around shield.

5. The system as recited in claim 1, wherein a width W1 of the inner region measured in a direction parallel to a plane of deposition of the wrap around shield and the media-facing end thereof is between about a width PW of the media-facing end of the magnetic pole and about 2×PW.

6. The system as recited in claim 5, wherein a width of the middle region on one side of the magnetic pole is between about 2.5×W1 and about 10×W1.

7. The system as recited in claim 1, wherein the height H1 of the inner region is between about 75 nm and about 250 nm.

8. The system as recited in claim 1, wherein the height HM of the middle region is between about 1.5×H1 and about 3×H1.

9. The system as recited in claim 8, wherein the height H2 of the second region is between about 1.5×HM and about 5×HM.

10. The system as recited in claim 1, further comprising a gap in the second region that separates the second region into multiple pieces.

11. The system as recited in claim 1, further comprising:
at least one head for reading from and writing to a magnetic medium, each head having:
a sensor for reading data written by the magnetic pole;
a slider for supporting the head; and
a control unit coupled to the head for controlling operation of the head.

12. A magnetic head system, comprising:

a magnetic pole having a media-facing end; and a wrap around shield spaced from the magnetic pole, wherein the wrap around shield has a media-facing end positioned along three sides of the media-facing end of the magnetic pole, wherein the wrap around shield has inner and second regions separated from each other by a transitional region, the inner region being closest to the media facing end of the magnetic pole, the second region being farther from the media facing end of the magnetic pole than the inner region, wherein cross-sectional heights of the regions of the wrap around shield are measured in a direction perpendicular to the media-facing end of the wrap around shield, wherein a cross-sectional height of the inner region is less than a cross-sectional height of the second region, wherein the second region is divided into two sections by a nonmagnetic gap.

13. The system as recited in claim 12, wherein a distal end of the second region farthest from the media-facing end of the magnetic pole and positioned laterally thereto is positioned beyond a side edge of an upper return pole.

14. The system as recited in claim 13, wherein the nonmagnetic gap is positioned below the upper return pole.

15. The system as recited in claim 12, wherein a width W1 of the inner region measured in a direction parallel to a plane of deposition of the wrap around shield and the media-facing end thereof is between about a width PW of the media-facing end of the magnetic pole and about 2×PW.

16. The system as recited in claim 15, wherein a width of the second region between the transitional region and the nonmagnetic gap on one side of the magnetic pole is between about 2×W1 and about 6×W1.

17. The system as recited in claim 12, wherein the height H1 of the inner region is between about 75 nm and about 250 nm.

18. The system as recited in claim 12, further comprising a middle region of the wrap around shield between the inner and second regions, the middle region being separated from the inner and second regions by transitional regions, wherein cross-sectional heights of the regions of the wrap around shield are measured in a direction perpendicular to the media-facing end of the wrap around shield, wherein the cross-sectional height of the inner region is less than the cross-sectional height of the middle region, wherein the cross-sectional height of the middle region is less than the cross-sectional height of the second region.

19. The system as recited in claim 12, further comprising:

at least one head for reading from and writing to a magnetic medium, each head having:

a sensor for reading data written by the magnetic pole;

a slider for supporting the head; and a control unit coupled to the head for controlling operation of the head.

20. A method for making a magnetic head, comprising:

forming a magnetic pole having a media-facing end; and forming a wrap around shield spaced from the magnetic pole, wherein the wrap around shield has a media-facing end positioned along three sides of the media-facing end of the magnetic pole, wherein the wrap around shield has inner, second, and middle regions separated by transitional regions, the inner region being closest to the media facing end of the magnetic pole, the second region being farthest from the media facing end of the magnetic pole, and the middle region being between the inner and second regions, wherein cross-sectional heights of the regions of the wrap around shield are measured in a direction perpendicular to the media-facing end of the wrap around shield, wherein a cross-sectional height of the inner region is less than a cross-sectional height of a second region, wherein a cross-sectional height of the middle region is greater than the cross-sectional height of the inner region and less than the cross-sectional height of the second region.

21. The method as recited in claim 20, further comprising forming a gap in the second region that separates the second region into multiple pieces.

22. A method for making a magnetic head, comprising:

forming a magnetic pole having a media-facing end; and forming a wrap around shield spaced from the magnetic pole, wherein the wrap around shield has a media-facing end positioned along three sides of the media-facing end of the magnetic pole, wherein the wrap around shield has inner and second regions separated from each other by a transitional region, the inner region being closest to the media facing end of the magnetic pole, the second region being farther from the media facing end of the magnetic pole than the inner region, wherein cross-sectional heights of the regions of the wrap around shield are measured in a direction perpendicular to the media-facing end of the wrap around shield, wherein a cross-sectional height of the inner region is less than a cross-sectional height of the second region, wherein the second region is divided into two sections by a nonmagnetic gap.

23. The method as recited in claim 22, wherein a distal end of the second region farthest from the media-facing end of the magnetic pole and positioned laterally thereto is positioned beyond a side edge of an upper return pole.

24. The method as recited in claim 23, wherein the nonmagnetic gap is positioned below the upper return pole.

* * * * *